(12) United States Patent
Onishi (10) Patent No.: US 7,136,181 B2
(45) Date of Patent: Nov. 14, 2006

(54) DATA OUTPUT SCHEDULING SYSTEM, MOBILE TERMINAL, AND DATA POOL APPARATUS

(75) Inventor: Joji Onishi, Isukuba (JP)

(73) Assignee: Seiko Epson Corporation, Tokyo (JP)

( * ) Notice: Subject to any disclaimer, the term of this patent is extended or adjusted under 35 U.S.C. 154(b) by 902 days.

(21) Appl. No.: 10/107,418

(22) Filed: Mar. 28, 2002

(65) Prior Publication Data

US 2002/0140972 A1 Oct. 3, 2002

(30) Foreign Application Priority Data

Mar. 29, 2001 (JP) ............................. 2001-097518

(51) Int. Cl.
*G06F 3/12* (2006.01)
*G06F 15/00* (2006.01)
*G06K 1/00* (2006.01)

(52) U.S. Cl. .................... 358/1.15; 379/29.1; 455/43.1

(58) Field of Classification Search ............... 358/1.15, 358/1.16; 709/203, 229; 379/29.1; 455/41.3, 455/556.2; 701/300
See application file for complete search history.

(56) References Cited

U.S. PATENT DOCUMENTS

| | | | | |
|---|---|---|---|---|
| 6,208,427 B1 * | 3/2001 | Lee | ............ | 358/1.15 |
| 6,246,376 B1 * | 6/2001 | Bork et al. | ............ | 343/760 |
| 6,430,601 B1 * | 8/2002 | Eldridge et al. | ............ | 709/206 |
| 6,601,102 B1 * | 7/2003 | Eldridge et al. | ............ | 709/229 |
| 6,748,471 B1 * | 6/2004 | Keeney et al. | ............ | 710/220 |
| 6,801,932 B1 * | 10/2004 | Picoult et al. | ............ | 709/206 |
| 2001/0018330 A1 * | 8/2001 | Yamauchi | ............ | 455/41 |
| 2002/0016833 A1 * | 2/2002 | Yajima et al. | ............ | 709/220 |
| 2002/0083114 A1 * | 6/2002 | Mazzagatte et al. | ........ | 709/100 |
| 2003/0017805 A1 * | 1/2003 | Yeung et al. | ............ | 455/41 |
| 2003/0123079 A1 * | 7/2003 | Yamaguchi et al. | ........ | 358/1.15 |
| 2005/0232425 A1 * | 10/2005 | Hughes et al. | ............ | 380/270 |

FOREIGN PATENT DOCUMENTS

| | | |
|---|---|---|
| JP | A 08-137776 | 5/1996 |
| JP | A 10-191453 | 7/1998 |
| JP | A 11-191043 | 7/1999 |
| JP | A 2001-075748 | 3/2001 |
| JP | 2001-256010 | 9/2001 |
| JP | 2001-312388 | 11/2001 |
| JP | A 2001-306273 | 11/2001 |
| JP | A 2002-073460 | 3/2002 |
| JP | A 2002-163093 | 6/2002 |

* cited by examiner

*Primary Examiner*—Kimberly Williams
*Assistant Examiner*—Dillon Murphy
(74) *Attorney, Agent, or Firm*—Oliff & Berridge PLC (57) ABSTRACT

The invention provides a data output scheduling system, a mobile terminal, and a data pool apparatus suitable that can provide a greater convenience to users when printing data. A data pool apparatus can include a storage device which stores print data so that the print data corresponds to access authentication information. When the data pool apparatus receives the print data and the access authentication information along with a registration request, the data pool apparatus registers the received print data and the access authentication information in the storage device so that the print data and the access authentication information correspond to each other. Also, the data pool apparatus transmits the access authentication information in the storage device to a mobile terminal. The mobile terminal receives the access authentication information. When a printer specified by a printer ID in the received access authentication information is within a predetermined range on the basis of the position of the mobile terminal, the mobile terminal transmits a print request for printing the print data corresponding to the received access authentication information to the printer.

6 Claims, 6 Drawing Sheets

DATA OUTPUT SCHEDULING SYSTEM, MOBILE TERMINAL, AND DATA POOL APPARATUS

BACKGROUND OF THE INVENTION

1. Field of Invention

The present invention relates to a data printing scheduling system and to a terminal and an apparatus applied to the system. The invention more specifically, relates to a data output scheduling system, a mobile terminal, and a data pool apparatus which are suitable for providing a greater convenience to users when printing data.

2. Description of Related Art

In current systems for printing data on a network, a network system for establishing a connection between a user terminal to be used by a user and a printer through a network and for printing data by the printer in response to a print request from the user terminal has commonly been used.

In current network systems, for example, when the user who has edited document data at their office wants to print the document data at home, the user is required to store the document data on an floppy disk (FD) or other medium using a terminal at the office, read the document data from the FD using a terminal at home, and instruct a printer at home to print the document data. Such print operation can be burdensome. The user may forget about printing the document data on their way home from the office, and hence the user may fail to print the document data. Therefore, if printing by the printer at home is scheduled by the terminal at the user's office, data is automatically printed at the time the user gets home. This can be very convenient.

SUMMARY OF THE INVENTION

In view of the unsolved problems encountered with known art, it is an object of the present invention to provide a data output scheduling system, a mobile terminal, and a data pool apparatus which are suitable for providing a greater convenience to users when printing data.

In order to achieve the foregoing objects, a data output scheduling system of the present invention can establish a connection among an output terminal which outputs data, a mobile terminal, and a data pool apparatus which pools output data for the output terminal, so that they can communicate with one another and the data output scheduling system can schedule the outputting of the output data. The data pool apparatus can include a storage device that stores the output data so as to correspond to scheduling information including output terminal information for specifying the output terminal. When the data pool apparatus receives the output data and the scheduling information along with a registration request, the data pool apparatus registers the received output data and the scheduling information in the storage device so that the output data and the scheduling information correspond to each other and transmits the scheduling information in the storage means to the mobile terminal. When the mobile terminal receives the scheduling information, and when the output terminal specified by the output terminal information in the received scheduling information is within a predetermined range on the basis of the position of the mobile terminal, the mobile terminal transmits an output request for outputting the output data corresponding to the received scheduling information to the data pool apparatus or to the output terminal.

Arranged as described above, when the data pool apparatus receives the output data and the scheduling information along with the registration request, the received output data and the scheduling information are registered in the storage device so that the output data and the scheduling information correspond to each other. The scheduling information in the storage device can be transmitted to the mobile terminal.

When the mobile terminal receives the scheduling information, and when the output terminal specified by the output terminal information in the received scheduling information is within the predetermined range on the basis of the position of the mobile terminal, the output request for outputting the output data corresponding to the received scheduling information is transmitted to the data pool apparatus or to the output terminal.

The mobile terminal is only required to transmit the output request to the data pool apparatus or to the output terminal. When the output request is transmitted to the data pool apparatus, and when the data pool apparatus receives the output request, the data pool apparatus is only required to transmit the output data in the storage device to the output terminal. When the output request is transmitted to the output terminal, and when the output terminal receives the output request, the output terminal is only required to obtain the output data from the data pool apparatus and to execute printing on the basis of the obtained output data. In the latter case, the mobile terminal may obtain the output data.

The storage device can store the output data and the scheduling information by using any available technique. The output data and the scheduling information can be stored beforehand. Instead of storing the output data and the scheduling information beforehand, the storage device can store the output data and the scheduling information by externally inputting the output data and the scheduling information thereto during operation of the data pool apparatus. The same applies to a data pool apparatus.

The output terminal can be of any structure, as long as it is structured to output data. This includes, for example, output terminals equipped with a display device for displaying data, a sound output device for outputting data in audio form, and print device for printing data. Hereinafter, the same applies to a mobile terminal and to a data pool apparatus.

In a data output scheduling system of the present invention, the data pool apparatus transmits the scheduling information in the storage device and the output data corresponding to the scheduling information to the mobile terminal. The mobile terminal receives the scheduling information and the output data and transmits a response request to the output terminal specified by the output terminal information in the received scheduling information. When the mobile terminal receives a response in response to the transmission of the response request, the mobile terminal transmits the received output data along with the output request to the output terminal. When the output terminal receives the response request, the output terminal transmits a response to the mobile terminal.

Arranged as described above, the data pool apparatus transmits the scheduling information in the storage device and the output data corresponding to the scheduling information to the mobile terminal.

When the mobile terminal receives the scheduling information and the output data, the response request is transmitted to the output terminal specified by the output terminal information in the received scheduling information.

When the output terminal receives the response request, the output terminal transmits a response to the mobile terminal.

When the mobile terminal receives the response, the received output data is transmitted along with the output request to the output terminal.

In a data output scheduling system of the present invention, the scheduling information can further include a first address indicating a storage location of the scheduling information in the storage device and a second address indicating a storage location of the output data in the storage device. The mobile terminal receives the scheduling information and obtains the scheduling information from the storage location specified by the first address in the received scheduling information. When the obtained scheduling information and the received scheduling information satisfy a predetermined relationship, the mobile terminal obtains the output data from the storage location specified by the second address in the received scheduling information.

Arranged as described above, when the mobile terminal receives the scheduling information, the scheduling information is obtained from the storage location specified by the first address in the received scheduling information. When the obtained scheduling information and the received scheduling information satisfy the predetermined relationship, the output data is obtained from the storage location specified by the second address in the received scheduling information.

The predetermined relationship is satisfied in the following cases, for example: a case in which scheduling information to be checked matches reference scheduling information; a case in which the result of calculating a predetermined arithmetic expression using scheduling information to be checked matches reference scheduling information; and a case in which the result of calculating a predetermined arithmetic expression using scheduling information to be checked matches the result of calculating a predetermined arithmetic expression using reference scheduling information.

In a data output scheduling system of the present invention, the scheduling information can further include output number information indicating the number of times the output data corresponding to the scheduling information can be output. When the number of times the output data can be output, which is specified by the output number information in the received scheduling information, satisfies a predetermined condition, the mobile terminal obtains the output data from the storage location specified by the second address in the received scheduling information. When the predetermined condition is not satisfied, the mobile terminal deletes the output data from the storage location specified by the second address in the received scheduling information.

Arranged as described above, when the number of times the output data can be output, which is specified by the output number information in the received scheduling information, satisfies the predetermined condition, the mobile terminal obtains the output data from the storage location specified by the second address in the received scheduling information. In contrast, when the number of times the output data can be output, which is specified by the output number information in the received scheduling information, does not satisfy the predetermined condition, the mobile terminal deletes the output data from the storage location specified by the second address in the received scheduling information.

In order to achieve the foregoing objects, a mobile terminal of the present invention can connect to an output terminal and a data pool apparatus in a data output scheduling system as described above so that the mobile terminal can communicate with the output terminal and the data pool apparatus. When the mobile terminal receives scheduling information, and when the output terminal specified by output terminal information in the received scheduling information is within a predetermined range on the basis of the position of the mobile terminal, the mobile terminal transmits an output request for outputting the output data corresponding to the received scheduling information to the data pool apparatus or to the output terminal.

Arranged as described above, the same operation as that of the mobile terminal in the data output scheduling system can be achieved.

In order to achieve the foregoing objects, a data pool apparatus of the present invention connects to a mobile terminal in a data output scheduling system as described above so that the data pool apparatus can communicate with the mobile terminal. The data pool apparatus can include a storage device for storing output data so that the output data corresponds to scheduling information. When the data pool apparatus receives the output data and the scheduling information along with a registration request, the data pool apparatus registers the output data and the scheduling information in the storage device so that the output data and the scheduling information correspond to each other. Also, the scheduling information in the storage device is transmitted to the mobile terminal.

Arranged as described above, the same operation as that of the data pool apparatus in the data output scheduling system as described can be achieved.

Although the data output scheduling system, the mobile terminal, and the data pool apparatus for achieving the foregoing objects have been proposed, it should be understood that the present invention is not limited to them. In order to achieve the foregoing objects, a first program and a second program which are described hereinafter can be proposed.

The first program is a program executable by a mobile terminal, which is formed by a computer. The first program causes the computer to receive scheduling information. When an output terminal specified by output terminal information in the received scheduling information is within a predetermined range on the basis of the position of the mobile terminal, the computer transmits an output request for outputting output data corresponding to the received scheduling information to the data pool apparatus or to the output terminal.

Arranged as described above, when the computer performs processing in accordance with the first program, the same operation and the same advantages as those of the mobile terminal as described above can be achieved.

The second program is a program executable by a data pool apparatus, which is formed by a computer. The computer can include a storage device for storing output data so as to correspond to scheduling information. When the computer receives the output data and the scheduling information along with a registration request, the computer is caused to register the received output data and the scheduling information in the storage device so that the output data and the scheduling information correspond to each other. Also, the computer is caused to transmit the scheduling information in the storage device to the mobile terminal.

Arranged as described above, when the computer performs processing in accordance with the second program, the same operation and the same advantages as those of the data pool apparatus as described above can be achieved.

BRIEF DESCRIPTION OF THE DRAWINGS

The invention will be described with reference to the accompanying drawings, in which like numerals reference like elements, and wherein.

DETAILED DESCRIPTION OF PREFERRED EMBODIMENTS

With reference to the drawings, the present invention will be further illustrated with embodiments below. FIGS. 1 to 9 illustrate an embodiment of a data output scheduling system, a mobile terminal, and a data pool apparatus according to the present invention.

Figure 1:
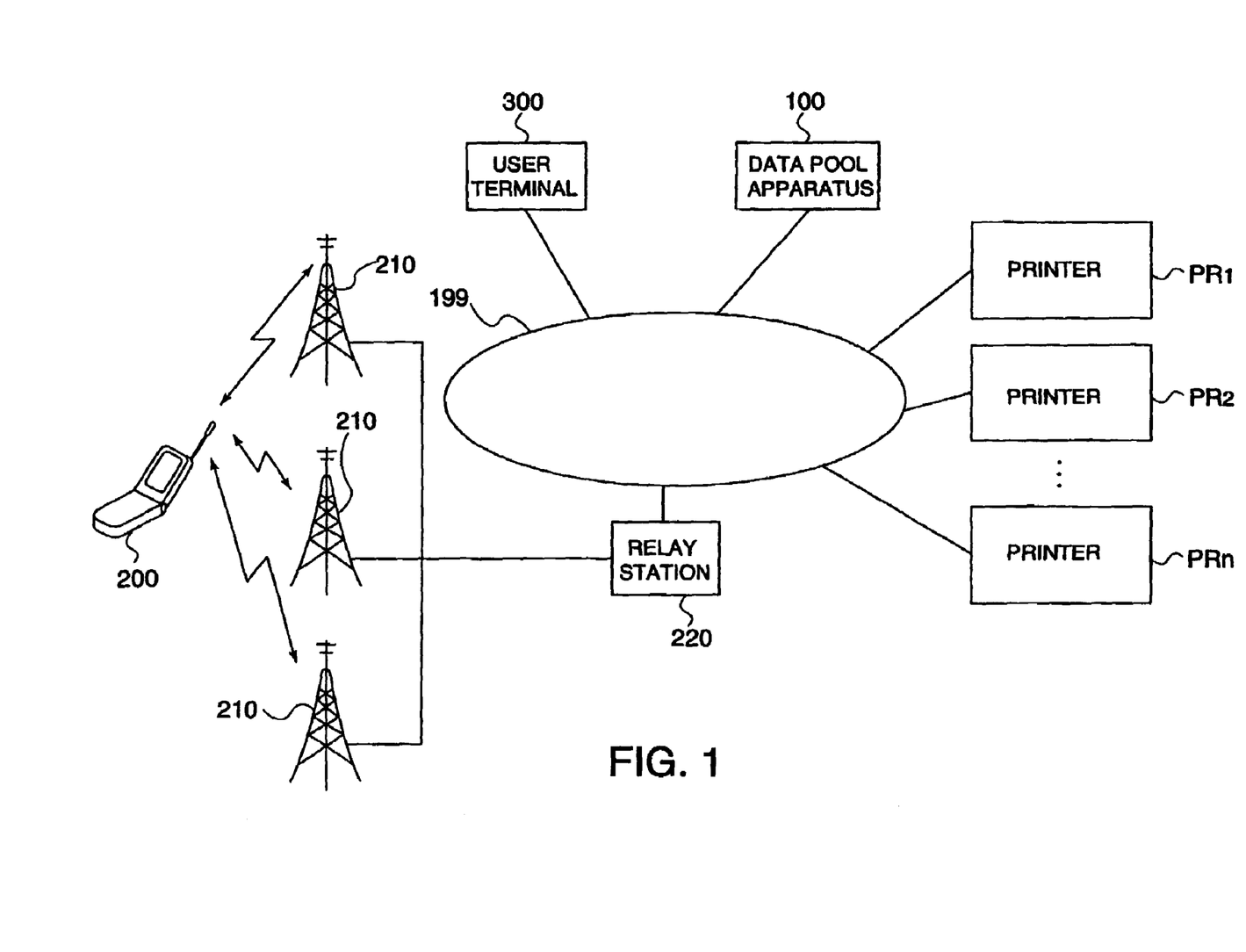
FIG. 1 is an exemplary block diagram showing the configuration of a network system to which the present invention is applied.

In this embodiment, the data output scheduling system, the mobile terminal, and the data pool apparatus according to the present invention are applied to a case in which, as shown in FIG. 1, printing of data is scheduled by a user terminal 300 and the data is printed by printers $PR_1$ to $PR_n$ in accordance with the position of a mobile terminal 200.

Referring to FIG. 1, the configuration of a network system to which the present invention is applied will now be described. FIG. 1 is an exemplary block diagram showing the configuration of a network system to which the present invention is applied.

As shown in FIG. 1, the printers $PR_1$ to $PR_n$ for printing data, a data pool apparatus 100 for pooling print data for the printers $PR_1$ to $PR_n$, a relay station 220 for relaying communication between the mobile terminal 200 and the Internet 199, and the user terminal 300 which is used by a user are connected to the Internet 199. In order to simplify the description, only one mobile terminal 200 and only one user terminal 300 are shown in the drawing. Actually, a plurality of mobile terminals and a plurality of user terminals can be connected to the Internet 199. In the following description, the printers $PR_1$ to $PR_n$ may be collectively referred to as a printer PR when one of the printers $PR_1$ to $PR_n$ is indicated.

A plurality of base stations 210 for wirelessly communicating with the mobile terminal 200 are connected to the relay station 220. When the mobile terminal 200 is to establish a connection to the Internet 199, the relay station 220 functions, in place of the mobile terminal 200, as a terminal on the Internet 199 and transmits data from the mobile terminal 200, which is received through the base stations 210, to a target terminal over the Internet 199. Also, the relay station 220 transmits data from a target terminal on the Internet 199 to the mobile terminal 200 through the base stations 210.

The configuration of the user terminal 300 will now be described in greater detail.

The user terminal 300 is structured to include the same functions as a general computer in which a CPU, a ROM, a RAM, an I/F, and the like are interconnected by a bus. External devices are connected to the I/F. Specifically, input devices such as a keyboard and a mouse which function as a human interface for inputting data, a storage device for storing print data as files, a display device for displaying a screen on the basis of image signals, and a signal line for establishing a connection to the Internet 199 are connected to the I/F.

Figure 2:
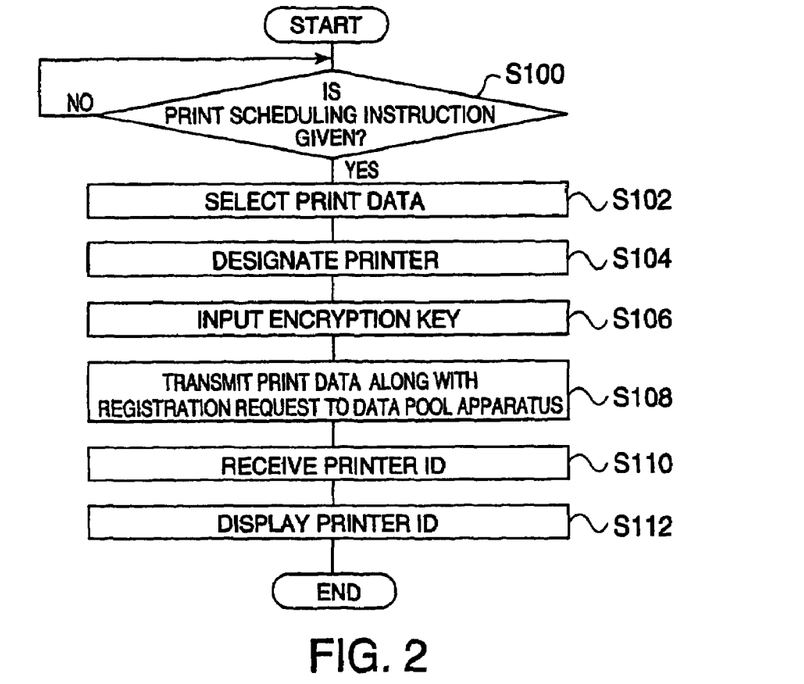
FIG. 2 is a flowchart showing an exemplary print data registration requesting process.

The CPU of the user terminal 300 can be formed by a micro-processing unit (MPU) or the like. The CPU activates a predetermined program stored in a predetermined region of the ROM. In accordance with the program, the CPU executes a print data registration requesting process shown by a flowchart in FIG. 2. FIG. 2 is the flowchart showing an exemplary print data registration requesting process.

The print data registration requesting process is a process for making a request to the data pool apparatus 100 to register print data when printing the print data by the printer PR designated by the user. When the process is executed by the CPU, as shown in FIG. 2, the process proceeds to step S100.

In step S100, the process determines whether or not the print scheduling instruction has been given by the user. If it is determined that the print scheduling instruction has been given by the user (Yes), the process proceeds to step S102. If it is determined otherwise (No), the process waits in step S100 until the print scheduling instruction is given.

In step S102, the process selects the print data to be printed from the storage device. In step S104, the process designates the printer PR from among the printers $PR_1$ to $PR_n$ to perform printing and proceeds to step S106.

In step S106, the process inputs an encryption key. In step S108, the process transmits the selected print data, the designation of the printer PR, and the input encryption key along with a registration request to the data pool apparatus 100. In step S110, the process receives the printer ID. In step S112, the process displays the received printer ID on the display device. The series of processing steps is terminated. The printer ID will be described in detail in the following description. The user memorizes the displayed printer ID and inputs the printer ID using the mobile terminal 200 in response to an input request.

Figure 3:
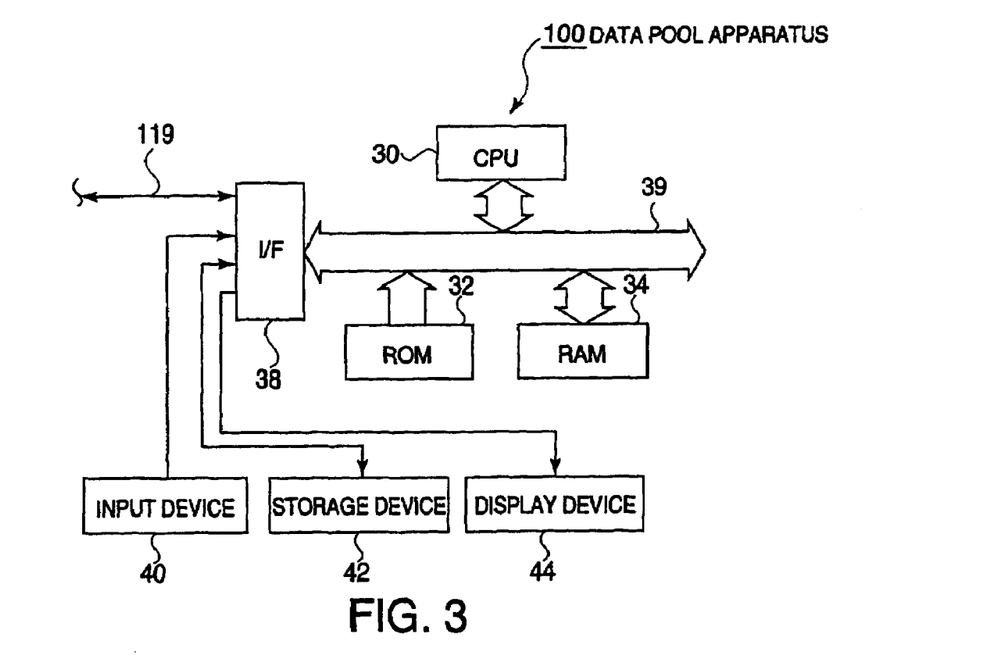
FIG. 3 is an exemplary block diagram showing the configuration of a data pool apparatus 100.

Referring to FIG. 3, the configuration of the data pool apparatus 100 will now be described in detail. FIG. 3 is an exemplary block diagram showing the configuration of the data pool apparatus 100.

As shown in FIG. 3, the data pool apparatus 100 can include a CPU 30 for controlling the operation and the entire system on the basis of a control program, a ROM 32 which stores beforehand the control program for the CPU 30 and the like in a predetermined region, a RAM 34 for storing data read from the ROM 32 and the operation results which are necessary in the course of operation of the CPU 30, and an I/F 38 for interfacing the data input/output with external devices. These components are interconnected by a bus 39, which can be a signal line for transferring data, so that these components can exchange data with one another.

The external devices are connected to the I/F 38. Specifically, an input device 40 including a keyboard and a mouse which functions as a human interface for inputting data, a storage device 42 for storing data and tables as files, a display device 44 for displaying a screen on the basis of image signals, and a signal line for establishing a connection to the Internet 199 are connected to the I/F 38.

Figure 4:
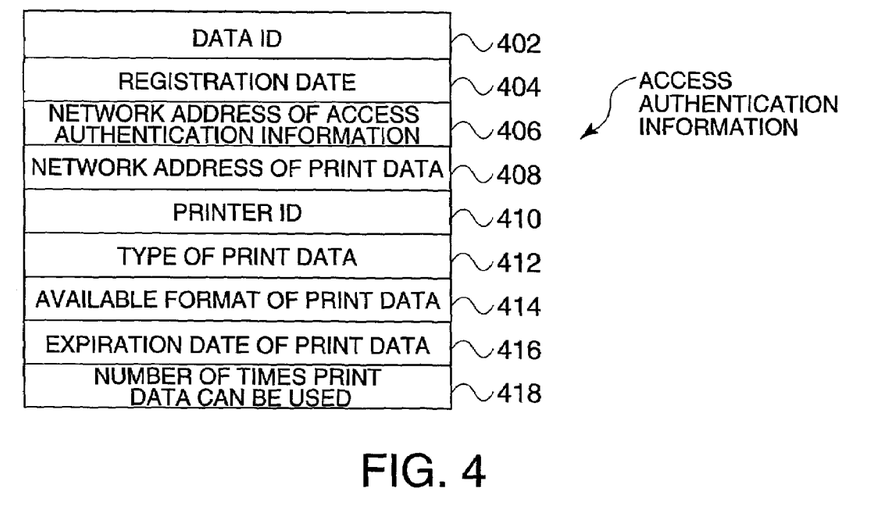
FIG. 4 is an illustration of the data structure of access authentication information.

In the storage device 42, print data is registered so as to correspond to access authentication information shown in FIG. 4. FIG. 4 illustrates the data structure of the access authentication information.

As shown in FIG. 4, the access authentication information can include a data region 402 for storing a data ID for specifying print data, a data region 404 for storing the date on which the print data is registered in the data pool apparatus 100, a data region 406 for storing the network address of the access authentication information, a data region 408 for storing the network address of the print data, a data region 410 for storing a printer ID for specifying the printer PR, a data region 412 for storing the type of the print data, a data region 414 for storing the available format of the print data, a data region 416 for storing the expiration date of the print data; and a data region 418 for storing the number of times the output data can be used.

Also, the storage device 42 stores therein the destination address of the mobile terminal 200. The destination address is pre-registered by the mobile terminal 200 by gaining access to the data pool apparatus 100. The destination address can include, for example, an e-mail address.

Figure 5:
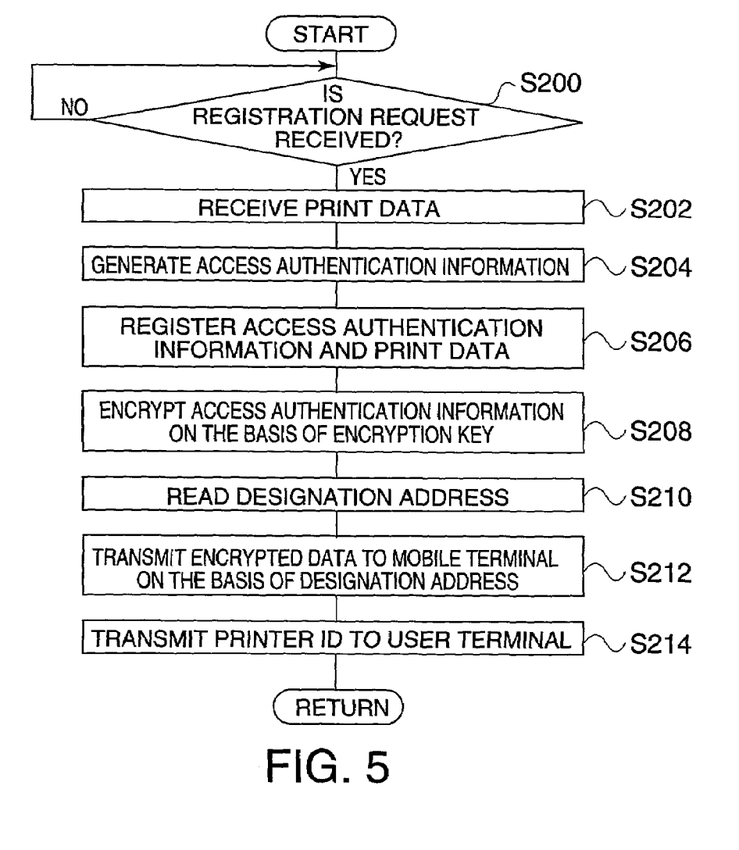
FIG. 5 is a flowchart showing an exemplary print data registering process.

The CPU 30 is formed by a micro-processing unit (MPU) or the like. The CPU 30 activates a predetermined program stored in a predetermined region of the ROM 32. In accordance with the program, the CPU 30 executes a print data registering process shown in a flowchart in FIG. 5. FIG. 5 is the flowchart showing an exemplary print data registering process.

The print data registering process is a process for registering print data in response to a registration request from the user terminal 300. When the process is executed by the CPU 30, as shown in FIG. 5, the process proceeds to step S200. The print data registering process is a process corresponding to the print data registration requesting process shown in FIG. 2.

In step S200, the process determines whether or not the registration request has been received. If it is determined that the registration request has been received (Yes), the process proceeds to step S202. If it is determined otherwise (No), the process waits in step S200 until the registration request is received.

In step S202, the process receives the print data, the designation of the printer PR, and the encryption key. In step S204, the process generates access authentication information on the basis of the received print data and the designation of the printer PR. In step S206, the process registers the received print data in the storage device 42 so that the print data corresponds to the generated access authentication information. Subsequently, the process proceeds to step S208.

In step S208, the process encrypts the access authentication information on the basis of the received encryption key. In step S210, the process reads the destination address of the mobile terminal 200 from the storage device 42. In step S212, the process transmits the encrypted data to the mobile terminal 200 on the basis of the read destination address. In step S214, the process transmits the printer ID of the access authentication information generated in step S204 to the user terminal 300. Subsequently, the series of processing steps is terminated, and the process returns to the former state.

Figure 6:
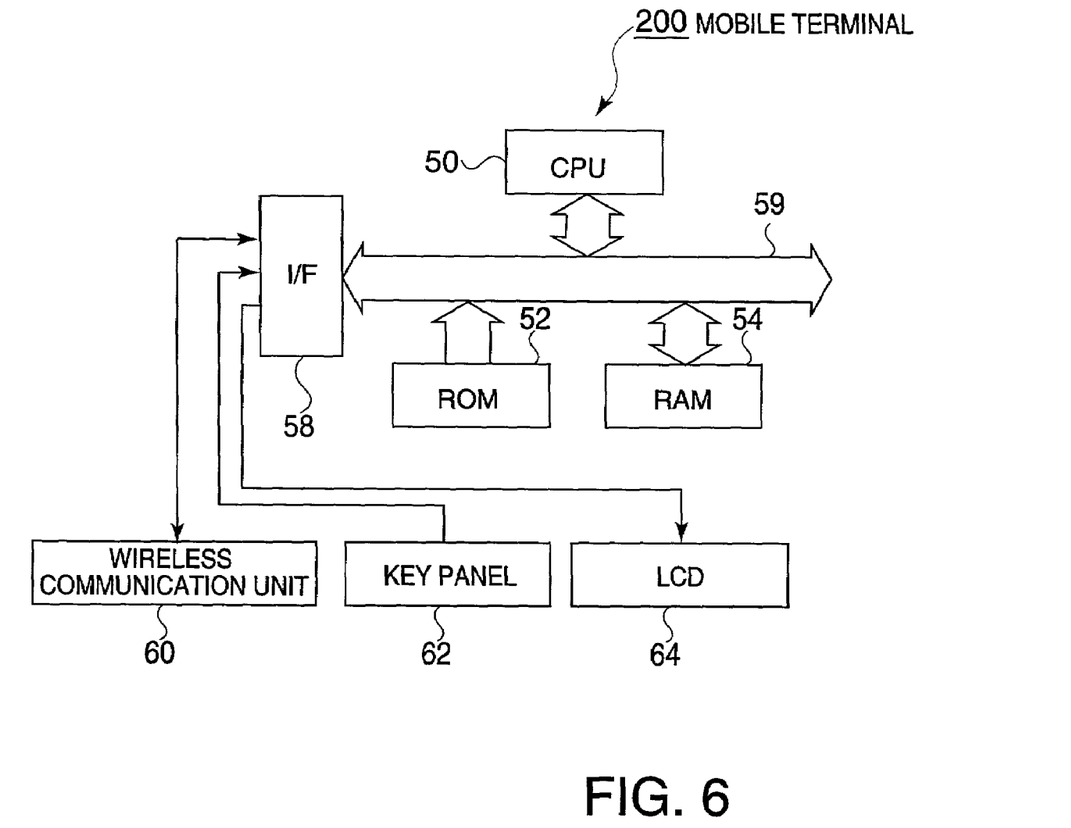
FIG. 6 is an exemplary block diagram showing the configuration of a mobile terminal 200.

Referring to FIG. 6, the configuration of the mobile terminal 200 will now be described in detail. FIG. 6 is an exemplary block diagram showing the configuration of the mobile terminal 200.

As shown in FIG. 6, similar to the data pool apparatus 100, the mobile terminal 200 is structured to include the same functions as a general computer. The mobile terminal 200 can include a CPU 50, a ROM 52, a RAM 54, an I/F 58, and the like which are interconnected by a bus. Connected to the I/F 58 can be a wireless communication unit 60 for performing wireless communication with the base stations 210 and the printers $PR_1$ to $PR_n$, a key panel 62 which can input data using a plurality of keys functioning as a human interface, and an LCD (liquid crystal display) 64 for displaying a screen on the basis of image signals.

The CPU 50 is formed by a micro-processing unit (MPU) or the like. The CPU 50 activates a predetermined program stored in a predetermined region of the ROM 52. In accordance with the program, the CPU 50 executes a print data obtaining process and a print requesting process shown in flowcharts in FIGS. 7 and 8, respectively, on a time-sharing basis.

Figure 7:
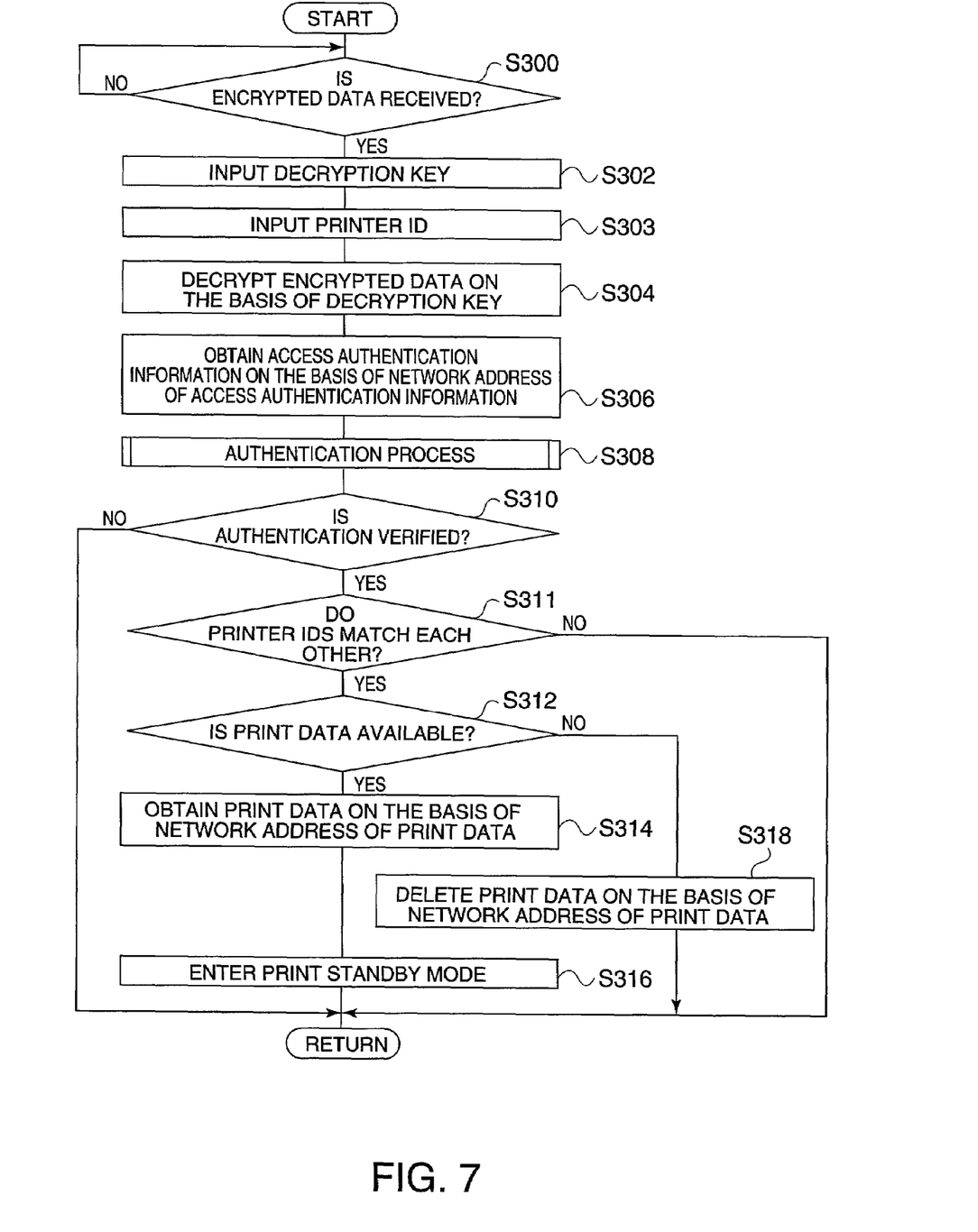
FIG. 7 is a flowchart showing an exemplary print data obtaining process.

Referring to FIG. 7, the print data obtaining process is described in detail. FIG. 7 is the flowchart showing an exemplary print data obtaining process.

The print data obtaining process is a process for obtaining print data on the basis of access authentication information generated by decrypting the encrypted data. When the process is executed by the CPU 50, as shown in FIG. 7, the process proceeds to step S300.

In step S300, the process determines whether or not the encrypted data has been received. If it is determined that the encrypted data has been received (Yes), the process proceeds to step S302. If it is determined otherwise (No), the process waits in step S300 until the encrypted data is received.

In step S302, the process inputs a decryption key. In step S303, the process inputs a printer ID. In step S304, the process decrypts the encrypted data on the basis of the input decryption key. In step S306, the process obtains the access authentication information from the data pool apparatus 100 on the basis of the network address of the access authentication information, which is included in the access authentication information got by decrypting the encrypted data. In step S308, the process performs an authentication process for determining whether or not the access authentication information got by the decrypting the encrypted data matches the obtained access authentication information. Subsequently, the process proceeds to step S310.

In step S310, the process determines whether or not the authentication has been verified by the authentication process in step S308. If it is determined that the authentication has been verified (Yes), the process proceeds to step S311 and determines whether or not the printer ID input in step S303 matches the printer ID included in the access authentication information obtained in step S306. If it is determined that these printer IDs match each other (Yes), the process proceeds to step S312.

In step S312, the process determines whether or not the print data is available on the basis of the number of times the print data can be used, which is included in the access authentication information got by decrypting the encrypted data. If it is determined that the print data is available (Yes), the process proceeds to step S314.

In step S314, the process obtains the print data from the data pool apparatus 100 on the basis of the network address of the print data, which is included in the access authentication information got by decrypting the encrypted data. In step S316, the process enters a print standby mode to wait to print the obtained print data. Subsequently, the series of processing steps is terminated, and the process returns to the former state.

If it is determined in step S312 that the print data is unavailable, the process proceeds to step S318 and deletes the print data from the data pool apparatus 100 on the basis of the network address of the print data, which is included in the access authentication information got by decrypting the encrypted data. Subsequently, the series of processing steps is terminated, and the process returns to the former state.

In contrast, if it is determined in step S311 that the printer ID input in step S303 does not match the printer ID included in the access authentication information obtained in step S306 (No), or if it is determined in step S310 that the authentication has been not verified (No), the series of processing steps is terminated, and the process returns to the former state.

Figure 8:
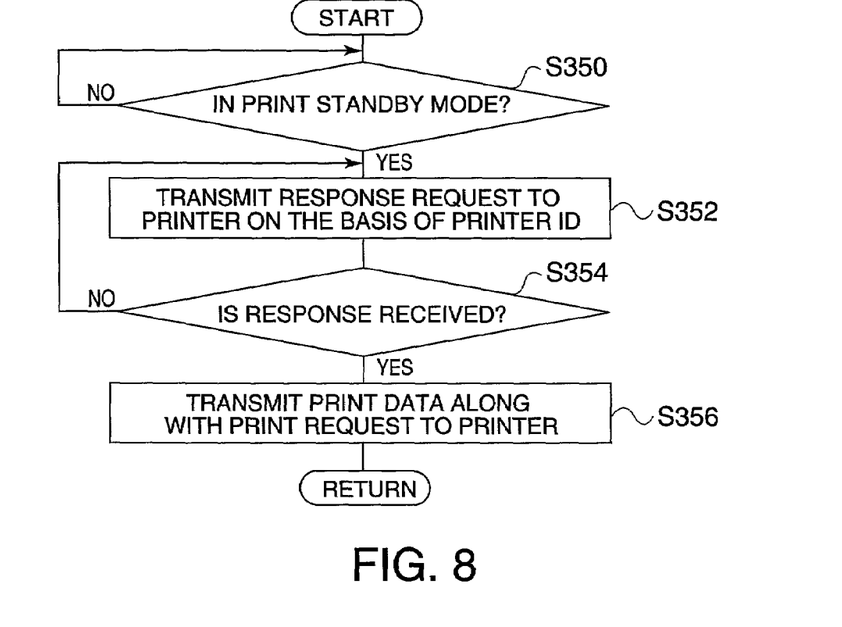
FIG. 8 is a flowchart showing an exemplary print requesting process.

Referring to FIG. 8, the print requesting process will now be described in detail. FIG. 8 is the flowchart showing an exemplary print requesting process.

The print requesting process is a process for making a request to the printers $PR_1$ to $PR_n$ to perform printing. When the process is executed by the CPU 50, as shown in FIG. 8, the process proceeds to step S350.

In step S350, the process determines whether or not it is in a print standby mode. If it is determined that the process is in a print standby mode (Yes), the process proceeds to step S352. If it is determined otherwise (No), the process waits in step S350 until it enters a print standby mode.

In step S352, the process wirelessly transmits a response request to the printer PR specified by the printer ID included in the access authentication information got by decrypting the encrypted data. In step S354, the process determines whether or not a response in response to the transmission of the response request has been received. If it is determined that the response has been received (Yes), the process proceeds to step S356 and wirelessly transmits the print data along with a print request to the printer PR which has given the response. Subsequently, the series of processing steps is terminated, and the process returns to the former state.

In contrast, if it is determined in step S354 that no response has been received (No), the process returns to step S352.

The configuration of the printers $PR_1$ to $PR_n$ will now be described in detail. Since all the printers $PR_1$ to $PR_n$ have the same functions, only the configuration of the printer $PR_1$ is described below. Descriptions of the other printers are omitted.

Similar to the data pool apparatus 100, the printer $PR_1$ is structured to include the same functions as a general computer in which a CPU, a ROM, a RAM, an I/F, and the like are interconnected by a bus. A wireless communication unit for performing wireless communication with the mobile terminal 200, a print unit for performing printing, and a signal line for establishing a connection to the Internet 199 are connected to the I/F.

Figure 9:
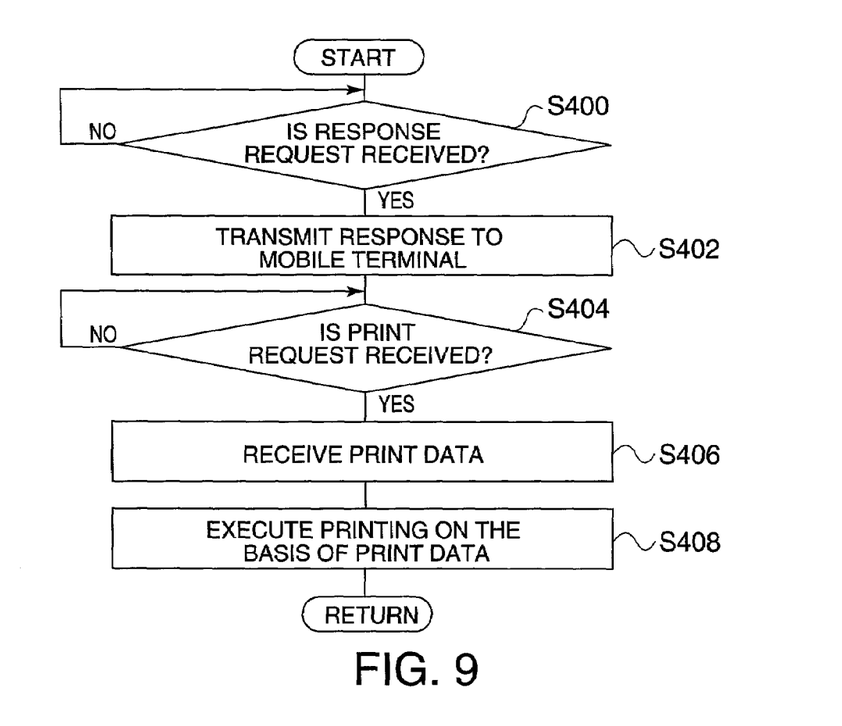
FIG. 9 is a flowchart showing an exemplary printing process.

The CPU of the user terminal $PR_1$ is formed by a micro-processing unit (MPU) or the like. The CPU activates a predetermined program stored in a predetermined region of the ROM. In accordance with the program, the CPU executes a printing process shown in a flowchart in FIG. 9. FIG. 9 is the flowchart showing an exemplary printing process.

The printing process is a process for printing print data in response to a print request from the mobile terminal 200. When the process is executed by the CPU, as shown in FIG. 9, the process proceeds to step S400. The printing process is a process corresponding to the print requesting process shown in FIG. 8.

In step S400, the process determines whether or not a response request has been received by wireless communication. If it is determined that the response request has been received (Yes), the process proceeds to step S402. If it is determined otherwise (No), the process waits in step S400 until the response request is received.

In step S402, the process wirelessly transmits a response to the mobile terminal 200. In step S404, the process determines whether or not a print request has been received by wireless communication. If it is determined that the print request has been received (Yes), the process proceeds to step S406. If it is determined otherwise (No), the process waits in step S404 until the print request is received.

In step S406, the process receives print data by wireless communication. In step S408, the process performs printing on the basis of the received print data. Subsequently, the series of processing steps is terminated, and the process returns to the former state.

The operation of the foregoing embodiment will now be described.

When printing data with the printers $PR_1$ to $PR_n$, a user gives a print scheduling instruction using the user terminal 300. When a print scheduling instruction is given, the user terminal 300 requests, in step S102, the user to select print data. In accordance with the selection request, the user inputs the selection of the desired print data to the input device.

When the selection of the print data is input, the user terminal 300 requests, in step S104, the user to designate the printer PR. In response to the designation request, the user designates the printer PR (for example, the printer $PR_1$) from among the printers $PR_1$ to $PR_n$ to perform printing.

When the designation of the printer PR is input, the user terminal 300 requests, in step S106, the user to input an encryption key. In response to the input request, the user inputs an appropriate encryption key.

When the encryption key is input, the user terminal 300 transmits, in step S108, the selected print data, the designation of the printer PR, and the input encryption key along with a registration request to the data pool apparatus 100.

When the data pool apparatus 100 receives the registration request, the data pool apparatus 100 receives, in steps S200 to S206, the print data, the designation of the printer PR, and the encryption key, generates access authentication information on the basis of the received print data and the designation of the printer PR, and registers the received print data in the storage device 42 so as to correspond to the generated access authentication information. At the same time, in steps S208 to S212, the data pool apparatus 100 encrypts the access authentication information on the basis of the received encryption key, reads the destination address of the mobile terminal 200 from the storage device 42, and transmits the encrypted data to the mobile terminal 200 on the basis of the read destination address.

When the mobile terminal 200 receives the encrypted data, the mobile terminal 200 requests, in steps S300 and S302, the user to input a decryption key. In response to the input request, the user inputs the decryption key corresponding to the encryption key which has been input by the user terminal 300.

When the decryption key is input, the mobile terminal 200 decrypts, in steps S304 and S306, the encrypted data on the basis of the input decryption key and obtains the access authentication information from the data pool apparatus 100 on the basis of the network address of the access authentication information, which is included in the access authentication information got by decrypting the encrypted data. In step S308, it is determined whether or not the access authentication information got by decrypting the encrypted data matches the obtained access authentication information. As a result, when the authentication is verified that both pieces of access authentication information match each other, in step S310, it is determined whether or not the print data is available on the basis of the number of times the print data can be used, which is included in access authentication information got by decrypting the encrypted data. As a result, when it is determined that the print data is available, in steps S312 to S316, the print data is obtained from the data pool apparatus 100 on the basis of the network address of the print data, which is included in the access authentication information got by decrypting the encrypted data. Subsequently, the system enters a print standby mode.

When the system enters a print standby mode, in steps S350 to S354, the mobile terminal 200 transmits a response request by wireless communication to the printer PR₁ specified by the printer ID included in the access authentication information got by decrypting the encrypted data.

In this state, the user with the mobile terminal 200 approaches the desired printer PR₁ until the user gets within a wireless communication range from the printer PR₁. The printer PR₁ receives the response request and, in steps S400 and S402, transmits a response to the mobile terminal 200.

When the mobile terminal 200 receives the response from the printer PR₁, in step S356, the mobile terminal 200 transmits the print data along with a print request to the printer PR₁ by wireless communication.

When the printer PR₁ receives the print request, in steps S406 and S408, the printer PR₁ receives the print data and performs printing on the basis of the received print data.

When the mobile terminal 200 cannot decrypt the received encrypted data with the decryption key input by the user, or when the mobile terminal 200 determines that the access authentication information got by decrypting the encrypted data does not match the obtained access authentication information, the print data is never printed even if the user with the mobile terminal 200 approaches the printer PR₁ and gets within the wireless communication range from the printer PR₁.

When the mobile terminal 200 determines that the print data is unavailable on the basis of the number of times the print data can be used, which is included in the access authentication information got by decrypting the encrypted data, in step S318, the print data is deleted from the data pool apparatus 100 on the basis of the network address of the print data, which is included in the access authentication information got by decrypting the encrypted data.

Accordingly, in this embodiment, the data pool apparatus 100 includes the storage device 42 which stores therein the print data so as to correspond to the access authentication information. When the data pool apparatus 100 receives print data and access authentication information along with a registration request, the data pool apparatus 100 registers the received print data and the access authentication information in the storage device 42 so that the print data and the access authentication information correspond to each other. Also, the data pool apparatus 100 transmits the access authentication information in the storage device 42 to the mobile terminal 200. The mobile terminal 200 receives the access authentication information. When the printer PR specified by the printer ID included in the received access authentication information is within a predetermined range on the basis of the position of the mobile terminal 200, the mobile terminal 200 transmits a print request to the printer PR to print the print data corresponding to the received access authentication information.

Accordingly, by registering print data and access authentication information in the data pool apparatus 100, the print data can be printed by the printer PR that the user desires. Thus, the print operation is simplified, and the possibility of failing to print data is reduced. It is thus possible to provide a relatively improved convenience to users when printing data compared with known technology.

In the foregoing embodiment, the mobile terminal 200 can be structured to obtain print data and to transmit the obtained print data along with a print request to the printer PR. However, it should be understood that the present invention is not limited to this structure. The mobile terminal 200 may be structured to transmit a print request to the data pool apparatus 100, and, when the data pool apparatus 100 receives the print request, the data pool apparatus 100 may transmit print data corresponding to the received print request.

In the foregoing embodiment, whether or not the printer PR specified by the printer ID is within a predetermined range on the basis of the position of the mobile terminal 200 is determined by determining whether or not the mobile terminal 200 is within a wireless communication range from the printer PR. However, the present invention is not limited to this structure. Alternatively, the determination can be made on the basis of position information on the mobile terminal 200 and position information on the printer PR. The determination can be made by the data pool apparatus 100, the mobile terminal 200, the user terminal 300, or a terminal other than these terminals.

In the foregoing embodiment, a case in which the control program which is stored in advance in the ROM 32 or 52 is executed to perform the processes shown in the flowcharts in FIGS. 2, 5, and 7 to 9 has been described. However, it should be understood that the present invention is not limited to this case. The processes can be performed by reading, from a storage medium having stored therein a program instructing a processor to perform these processes, the program into the RAM 34 or 54.

The storage medium includes a semiconductor storage medium, such as a RAM or a ROM, a magnetic storage medium such as an FD or an HD, an optical storage medium such as a CD, a CDV, an LD, or a DVD, and a magneto-optical storage medium such as an MO. The storage medium includes any type of storage medium regardless of the reading method such as electronic, magnetic, or optical as long as it is a computer-readable storage medium.

In the foregoing embodiment, a case in which the data output scheduling system, the mobile terminal, and the data pool apparatus according to the present invention are applied to the network system formed by the Internet 199 has been described. However, it should be understood that the present invention is not limited to this case. For example, the data output scheduling system, the mobile terminal, and the data pool apparatus can be applied to an intranet which performs communication using the same system as the Internet 199. Needless to say, the data output scheduling system, the mobile terminal, and the data pool apparatus are not only applicable to a network which performs communication using the same system as the Internet 199 but also applicable to a general network.

In the foregoing embodiment, the data output scheduling system, the mobile terminal, and the data pool apparatus according to the present invention are applied to a case in which, as shown in FIG. 1, printing of data is scheduled by the user terminal 300 and the data is printed by the printers PR₁ to PR_n in accordance with the position of the mobile terminal 200. However, it should be understood that the present invention is not limited to this case. The present invention can be applied to other cases without departing from the spirit and scope of the invention.

As described above, according to a data output scheduling system of the present invention, output data can be printed by an output terminal that a user desires by simply registering the output data and scheduling information in a data pool apparatus. Thus, the output operation is simplified, and the possibility of failing to print data is reduced. The data output scheduling system is advantageous over a known system in that it is possible to provide a relatively improved convenience to users when outputting data.

According to a mobile terminal of the present invention, an advantage equivalent to that of the data output scheduling system as described above can be achieved.

According to a data pool apparatus of the present invention, an advantage equivalent to that of the data output scheduling system as described above can be achieved.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A data output scheduling system for establishing a connection among an output terminal which outputs data, a mobile terminal, and a data pool apparatus which pools output data for the output terminal, for communication with one another, and for scheduling an outputting of the output data, the data pool apparatus comprising a storage device that stores the output data so that the output data corresponds to scheduling information including output terminal information that specifies the output terminal, when the data pool apparatus receives the output data and the scheduling information along with a registration request, the data pool apparatus registers the received output data and the scheduling information in the storage device so that the output data and the scheduling information correspond to each other and further transmits the scheduling information in the storage device to the mobile terminal, and when the mobile terminal receives the scheduling information and when at least one of the mobile terminal itself and the data pool apparatus determines that the output terminal specified by the output terminal information in the received scheduling information is within a predetermined range on the basis of the position of the mobile terminal, the mobile terminal transmits an output request for outputting the output data corresponding to the received scheduling information to the data pool apparatus.

2. A data output scheduling system according to claim 1, the data pool apparatus transmitting the scheduling information in the storage device and the output data corresponding to the scheduling information to the mobile terminal, the mobile terminal receives the scheduling information and the output data and transmits a response request to the output terminal specified by the output terminal information in the received scheduling information, and, when the mobile terminal receives a response in response to the transmission of the response request, the mobile terminal transmits the received output data along with the output request to the output terminal, and when the output terminal receives the response request, the output terminal transmits a response to the mobile terminal.

3. A data output scheduling system according to claim 1, the scheduling information further including a first address indicating a storage location of the scheduling information in the storage device and a second address indicating a storage location of the output data in the storage device, and the mobile terminal receives the scheduling information and obtains the scheduling information from the storage location specified by the first address in the received scheduling information, and, when the obtained scheduling information and the received scheduling information satisfy a predetermined relationship, the mobile terminal obtains the output data from the storage location specified by the second address in the received scheduling information.

4. A data output scheduling system according to claim 3, wherein the scheduling information including output number information indicating the number of times the output data corresponding to the scheduling information can be output, and when the number of times the output data can be output, which is specified by the output number information in the received scheduling information, satisfies a predetermined condition, the mobile terminal obtains the output data from the storage location specified by the second address in the received scheduling information, and when the number of times the output data can be output does not satisfy the predetermined condition, the mobile terminal deletes the output data from the storage location specified by the second address in the received scheduling information.

5. A mobile terminal for connecting to an output terminal and a data pool apparatus in the data output scheduling system recited in claim 1 so that the mobile terminal can communicate with the output terminal and the data pool apparatus, wherein, when the mobile terminal receives scheduling information and when the output terminal specified by output terminal information in the received scheduling information is within a predetermined range on the basis of the position of the mobile terminal, the mobile terminal transmits an output request for outputting output data corresponding to the received scheduling information to at least one of the data pool apparatus and the output terminal.

6. A data pool apparatus for connecting to a mobile terminal in a data output scheduling system as recited in claim 1 so that the data pool apparatus can communicate with the mobile terminal, comprising:

a storage device that stores output data so that the output data corresponds to scheduling information, wherein, when the data pool apparatus receives the output data and the scheduling information along with a registration request, the data pool apparatus registers the received output data and the scheduling information in the storage device so that the output data and the scheduling information correspond to each other, and the data pool apparatus transmits the scheduling information in the storage device to the mobile terminal.

* * * * *